July 25, 1950   F. C. KNIGHT ET AL   2,516,777
CONTROL APPARATUS FOR AUTOMATIC WELDING HEADS
Filed July 28, 1947
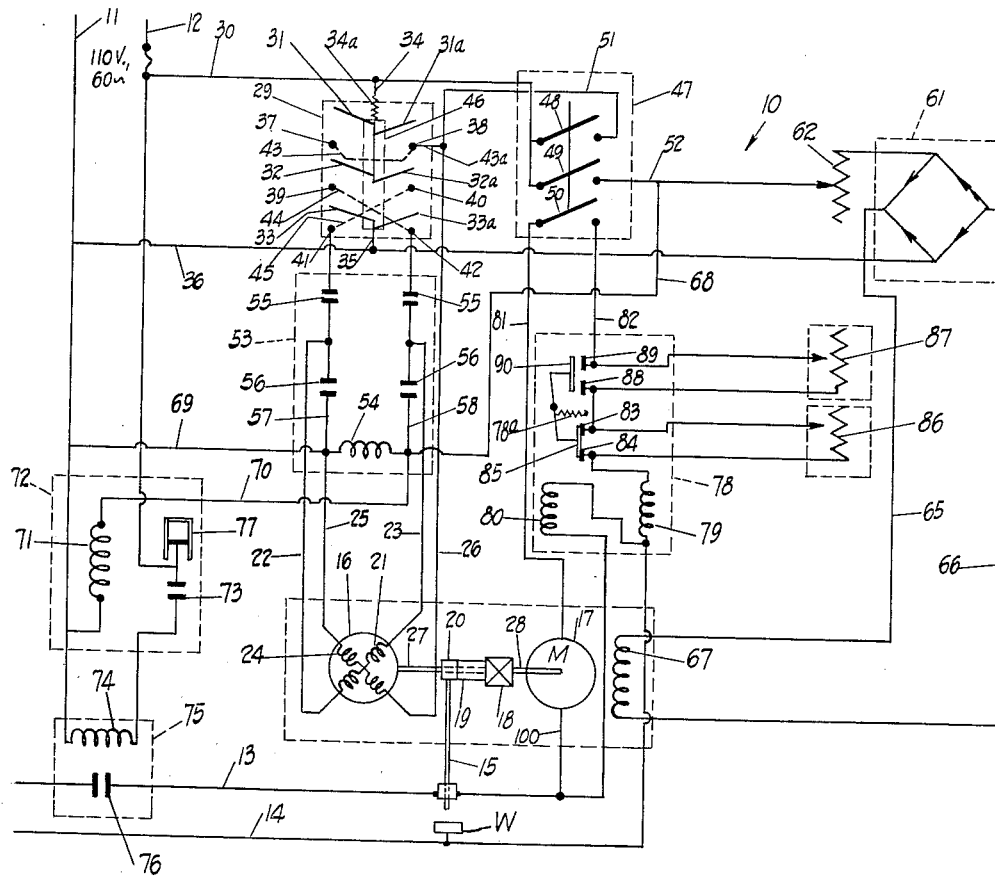
INVENTOR.
FLOYD C. KNIGHT AND
ELLIOT C. CORNELL JR.
BY
O Oldham & O Oldham
ATTORNEYS.

Patented July 25, 1950

2,516,777

UNITED STATES PATENT OFFICE 2,516,777

CONTROL APPARATUS FOR AUTOMATIC WELDING HEADS

Floyd C. Knight and Elliott C. Cornell, Jr., East Cleveland, Ohio, assignors to The Auto Arc-Weld Manufacturing Company, Cleveland, Ohio, a corporation of Ohio Application July 28, 1947, Serial No. 764,090

8 Claims. (Cl. 314—62)

This invention relates to welding heads for positioning and feeding a welding electrode, especially to welding heads that automatically feed weld rod to the weld, dependent upon the rate of deposit of weld material.

Welding heads of the above class have heretofore been provided, as exemplified by the structures shown in Patents 1,514,591, 1,514,592 and 1,563,612. The welding heads include two electric motors which connect through a differential to a shaft that controls the feed of the weld rod. The motors are driven in opposite directions with one motor being adapted to drive the weld rod towards the weld and with the second motor being driven so as to lift the weld rod away from the weld. The first of these motors is ordinarily controlled by the current through or voltage on the weld while the second motor usually is a constant speed device.

The previous types of welding heads and their controls have required both an A. C. and a D. C. energy supply, and some heads have been started and stopped by breaking the weld circuit which involves large, expensive circuit breakers, etc., as part of the control. Furthermore, some of these prior heads also have been bulky, have required use of involved starting circuits, have been difficult and expensive to install, have had a large number of costly operating parts, or have been otherwise objectionable.

A general object of this invention is to avoid the foregoing and other disadvantages of the objections to prior types of automatic welding heads and to provide a welding head and control that is characterized by its ability to function from a standard 110 volt 60 cycle supply.

A further object of the invention is to provide a small, compact, light weight automatic welding head which can be easily installed and which has a minimum of operating parts.

Another object of the invention is to position the electrode in predetermined relationship to the work prior to closing the welding or control circuits.

Yet another object is to provide a welding head control with all of the control relays being contained in a control cabinet and with at least substantially all of such relays being directly connected to switches.

Another object of the invention is to provide a separate electrode control switch that will operate one control motor in either direction to bring it to a desired starting position.

Another object of the invention is to retain the weld circuit closed a short interval after the feed of the weld rod has been discontinued to prevent the formation of a crater at the end of the weld.

Further and more limited objects of the invention are to start both control motors simultaneously; to provide a D. C. motor in parallel with the weld circuit to control the feed of the weld rod towards the weld; to insert a high resistance automatically in the armature circuit of the D. C. motor when it is started; to reduce the resistance in the D. C. armature circuit after the motor is started; and to rectify part of the A. C. supply for use in setting up a D. C. field for the D. C. motor.

The foregoing and other objects and advantages of the invention will be made more apparent as the specification proceeds.

Reference is made to the accompanying drawing which is a diagrammatic showing of the electric circuit of the automatic weld head and control of the invention.

An important feature of the invention is that power is provided for operating the automatic welding control, indicated generally by the numeral 10, by leads 11 and 12 that connect to a standard supply of 110 volt 60 cycle current. The welding current, in this instance D. C., is provided by means connected to leads 13 and 14 with lead 13 connecting to the electrode or weld rod 15, and lead 14 connecting to the work W. The electrode 15 usually comprises a continuous wire.

As in previous apparatus similar to that of this invention, two oppositely rotating motors, an A. C. motor 16 and a D. C. motor 17 are connected together through a differential 18 which connects to the motor shafts. The differential 18 is thus caused to rotate only through differences in speeds of the motors 16 and 17. The motor 16 is a constant speed motor while the motor 17 is a variable speed motor adapted to alter its speed in accordance with the weld conditions. The differential 18 has a shaft 19 extending therefrom which connects to a member 20 that is secured to the electrode 15 in any suitable manner so as to position such electrode with relation to the work and control the rate of feed of the electrode. The control means of the invention are connected to this substantially standard motor-differential-electrode control so as to maintain the electrode 15 in desired relationship with the work W.

One special feature of the A. C. motor 16 is that it is a split-phase motor and has two fields by which it can be operated. One field, the "run" field 21 is connected to leads 22 and 23, while the second or "start" field 24 connects to leads 25 and 26. Reversal of the "start" field of the motor 16 is adapted to cause it to rotate in opposite directions with the "run" field being normally adapted to drive shaft 27 secured to the motor 16 in such a direction as to cause the differential 18 and means 20 to raise the electrode 15 with relation to the work. Shaft 28 connects to the motor 17 and in turn connects to the differential 18 so as to cause means 20 to move the electrode 15 towards the work whereby these motors, by variation of their relative speeds, can maintain the electrode in desired relationship to the work after a weld has been started by controlling the feed of the electrode wire 15.

In order to set the electrode 15 in a predetermined relationship to the work W prior to starting weld action, a three-connection, two closed position switch 29 is provided. This control switch 29 has contact members 31, 32, and 33, and 31a, 32a and 33a with the contact members 31, 31a, 32 and 32a being connected together by lead 34 which, in turn connects to lead 30 that extends from the power supply lead 12. The remaining contact members 33 and 33a connect to a lead 35 which in turn connects to lead 36 that extends to the opposite power supply lead 11 so that a circuit can be set up through the switch 29. Contact points 37, and 38; 39 and 40; and 41 and 42 are provided in the switch 29 for association with the contact members 31, 31a, 32, 32a, 33 and 33a respectively. Switch 29 also has a connecting lead 43 extending between contacts 37 and 38 while leads 44 and 45 extend between the diagonally opposed contacts 39 and 42, and 40 and 41, respectively. The switch is adapted to close either contact members 32 and 33, or 32a and 33a, as desired. Hence by moving the control bar 46, associated with the three contact members and to which such members are secured, to different positions, the circuit of the A. C. motor 16, which is connected to the switch 29 as hereinafter explained, can be altered so as to cause the motor 16 to operate in either desired direction for purposes of positioning the electrode 15 prior to start of weld action.

An A. C. interlock relay 53 is provided between the control switch 29 and the motor 16 for regulating the operation of such motor. This relay 53 has an operating coil 54 and it includes two pairs of switches or contacts 55, 55, and 56, 56. One of each of the contacts 55 and 56 is positioned in leads 57 and 58 which extend through the relay and connect to contacts 41 and 42 of the control switch 29. Leads 22 and 23 connect to the leads 57 and 58 intermediate the switches or contacts 55 and 56 and such leads 22 and 23 connect to the field 21 of motor 16 for energizing that field. Normally the contacts 55 are closed whereby current will flow to the field 21 as soon as either set of contacts of the switch 29, 32 and 33, or 32a and 33a is brought into engagement with its associated contacts. Energization of the field 24 of motor 16 is effected by both closed positions of switch 29 and the reversal of the motor 16 is achieved by changing the power supply connections of the field 21, dependent upon the position of the control switch 29. That is, the control bar 46 can be moved to close contact arm 32a against contact 40 so lead 45, lead 57 and lead 22 energize one side of the field 21 while its other side connects through lead 23, 58, contact 42, contact arm 33a and lead 35 to the opposite power lead. Or, the control bar 46 can be moved to close contact arm 32 against contact 39 and contact arm 33 against contact 41 which reverses the flow of current through the run field 21. In either closed position of switch 29, arm 31 or 31a closes a circuit from power lead 12 through leads 30 and 34, contact 37 and lead 43 or contact 38, to a lead 43a that extends to lead 26 for the field 24. The other side of field 24 connects to power lead 11 through lead 25 and a lead 69. Hence the switch 29 provides means for rotating the motor 16 in either direction when the remainder of the apparatus is not functioning.

A starting switch 47 is provided for the apparatus 10 and such switch 47 includes three contact members 48, 49 and 50 with contacts 48 and 49 being connected to lead 30 and being adapted to close circuits to leads 51 and 52 respectively.

From the starting switch 47, the lead 51, closed by contact 48 connects to the lead 26 of the start field 24 of the motor 16 and causes the motor 16 to start and run in such direction as to feed the electrode 15 away from the work W. The second contact arm of the start switch 47, through lead 52, connects to a conventional rectifier unit 61, such as a selenium rectifier, which is adapted for full wave rectification of the A. C. energy supplied thereto. Lead 36 extends to the rectifier unit 61 to complete the circuit therefrom for its energization. A variable resistor 62 is provided in lead 52 so as to provide a control for the voltage output of the rectifier unit 61. Leads 65 and 66 connect the output side of the rectifier 61 to a separately excited field 67 for the motor 17 whereby a constant D. C. voltage is supplied for such field and control of the motor 17 is effected by variation of its armature current, as hereinafter explained. However, the motor 17 can also be controlled by variation of the resistance 62, when desired. A lead 68 extends from the lead 52 of the switch 47 to the lead 58 and extends to the operating coil 54 for relay 53 a circuit through which is completed to power supply lead 11 by lead 69. Hence the relay 53 is energized when the switch 47 is closed. Energization of the relay 53 causes it to open contacts 55, 55 and close contacts 56, 56 whereby the preset switch 29 is cut out of the control circuit and the fields 21 and 24 of motor 16 are so correlated as to cause the motor to drive the motor to raise the electrode 15 from the work.

So as to control the weld circuit, a lead 70 connects to the lead 68 and connects it to the power supply lead 11 through operating coil 71 of a delay relay 72. This delay relay 72 controls a switch or contact element 73 which is included in the lead 12 and controls the flow of current through an operating coil 74 of a relay 75 which controls contacts 76 in the weld circuit. Thus closing switch 47, through the contact element 49 thereof, also energizes the delay relay 72 which, in turn, energizes coil 74 of relay 75 so as to close contact 76 and complete the weld circuit for weld action. The contacts 73 have a delay element, such as a dash-pot 77, connected to them or their controls whereby the contacts 73 are not immediately opened when the coil 71 is de-energized, but a slight and variable time lag is effected before the contacts 73 are opened whereby operating coil 74 of the weld control relay 75 is temporarily energized after the start or control switch 47 is opened. Hence current flows through the weld circuit for a slight interval after the control circuit for the apparatus 10 is opened and this prevents formation of a crater in the weld at its terminal end.

In order to control the current flowing through the armature of motor 17 on closing the switch 47 to start the apparatus in action, a relay 78 is provided in the armature circuit. This relay 78 has an operating coil 79 which is connected in series with the motor armature whereas a second operating coil 80 is connected in parallel with such armature. Such coils 79 and 80 each control one position or setting of the relay which has two operative positons so that the coils 79 and 80 are, in effect, opposed and one must overcome the other to change the setting of the relay. The parallel coil 80 is directly connected between the leads 13 and 14 of the weld circuit so that such coil is energized immediately and sufficiently upon closing the contact 76 by the high inrush current so that it controls the relay setting. This coil 80 then serves to hold in the relay 78 until balanced circuit conditions and normal weld voltage are established. The armature of motor 17 connects to the switch element 50 of the starting switch 47 by a lead 81 whereas a lead 82 connects the other side of such switch element 50 back through the operating coil 79 to the weld current supply lead 14. Lead 100 connects the armature of motor 17 to weld circuit lead 13. The relay 78 is adapted, when high open circuit voltage is impressed on the motor armature circuit, to open a pair of contacts 83 and 84 which normally are held in electrical contact with a contact 85 by a variable tension spring 78ª so that a variable resistance 86, connected to the contacts 83 and 84, is placed in the armature circuit for motor 17. This resistance 86 is of sufficiently high value as to reduce the armature current appreciably on starting so as to slow down the armature speed and hence downward movement of the electrode 15 to a desired value. The apparatus of the invention normally has a separate generator associated with it for provision of weld current and its open circuit terminal voltage is appreciably higher than its terminal voltage when weld current is passing therethrough. When normal welding voltages exist on the armature of the motor 17, after a weld arc is struck, the relay 78 is adapted to close contacts 83 and 84 against contact 85 and short out the resistance 86, as the coil 80 will no longer be energized sufficiently to hold the relay with contact 85 open. The series coil 79 is provided to aid in snapping the relay 78 to its run position wherein a secondary adjustable resistance 87 is connected in the circuit. On normal operating conditions, the relay 78 holds open contacts 88 and 89 that connect to the resistance 87 and they insert such resistance in lead 82 of the armature circuit with spring 78ª urging contact 90 to its open position. However, when high starting voltages exist, the resistance 87 is shorted out of the circuit by the relay 78 through the contact 90 which is associated with the contacts 88 and 89 since at such time, the coil 80 is sufficiently energized to overcome the action of the spring urging contact 90 toward its open position. Hence means are provided for automatically limiting the initial current through the armature of motor 17 and such means automatically adjust the resistance in the armature circuit to permit it to feed the electrode down towards the work, in combination with the motor 16 and its action, at the desired rate. The resistance 86 is adjusted when the control apparatus is initially coupled to its welding circuit, but once adjusted, usually requires no further variation for given weld conditions. Then, after adjusting the resistor 62, the apparatus 10 is ready for complete automatic action after these few simple adjustments are made. Since the control apparatus can be plugged into an ordinary 110 volt 60 cycle power supply, it is very easy to set up, or install. The weld leads 13 and 14, of course, also can easily be connected to leads 82 and 100 of the armature circuit of motor 17 to connect the motor in parallel to the weld and have the speed of the motor vary in accordance with the weld resistance.

Also, in some instances, it may be desirable to connect the relay 75 to other than the weld circuit so as to permit the use of lighter circuit breakers. Hence, we may connect the relay 75 so that it controls the field circuit of the generator connected to the apparatus for supply of welding current.

Should the control apparatus 10 be used with an A. C. weld circuit, conventional means, such as a transformer and a rectifier should be connected between the weld circuit and the armature of the D. C. motor.

In order to slow down the motor 16 and permit fine control on the starting positon of the electrode 15, a resistance 34ª is connected in the lead 34 to reduce the speed for inching the electrode into a desired position. The resistance 34ª may be variable, if desired.

One complete embodiment of the invention has been illustrated and described in detail herein but it will be realized that the invention is not limited to the specific example set forth since modification may be resorted to within the scope of the appended claims.

We claim:

1. An automatic weld head control for supplying current to an arc through an electrode, adapted to be operated from a conventional A. C. power supply, comprising differential means, a constant speed A. C. motor connected to said differential means for driving it in one direction, a variable speed D. C. motor connected to said differential means for driving it, said D. C. motor having its armature connected in parallel to the arc, rectifier means having a constant D. C. output, means for connecting said rectifier means to an A. C. power supply, means for connecting the D. C. output of said rectifier means to the separately excited field of said D. C. motor, said A. C. motor having two fields the reversal of one of which will cause opposite rotation of the motor, a separate starting and reversal switch for said A. C. motor, a relay connected in the circuit between said switch and said motor and being adapted to open such circuit when energized, and a common starting switch for both of said motors, said common starting switch being connected to a conventional A. C. power supply and to said relay for energizing it when such switch is closed for cutting said separate starting and reversal switch out of the circuit.

2. In an automatic welding head control for supplying current to an arc through an electrode for a weld, a D. C. motor having a separately excited field, the armature of said motor being connected in parallel to the arc, a relay having an operating coil connected in series with said motor and having a second operating coil connected in parallel to the arc, said parallel operating coil being adapted to hold in said relay until a weld arc is struck, and a high and a low resistance connected to said relay which is adapted to change the armature circuit to insert said high resistance in the armature circuit when starting said motor, said relay changing its position to remove said high resistance from the armature circuit substantially simultaneously with the establishment of a weld arc, a low resistance being included in the armature circuit after the weld arc is struck.

3. In an automatic welding head control for supplying a current to an arc through an electrode for a weld, a D. C. motor having a separately excited field, the armature of said motor being connected in parallel to the arc, a relay having an operating coil connected in series with the armature of said motor and having a second operating coil connected in parallel to the arc, said parallel operating coil being connected to the power supply of the weld circuit and being adapted to place and hold said relay in a given position until a weld arc is struck, and resistance means connected in the armature circuit of said motor with the value of same being controlled by the setting of said relay, said resistance means having a high and a low resistance, said relay inserting the high resistance in the armature circuit before a weld arc is established and changing the relay position to insert the low resistance in the armature circuit after the weld arc is struck.

4. In an automatic welding head having a power source adapted to provide appreciably higher open circuit voltage than welding circuit voltage, a D. C. motor having an output shaft, a continuous electrode, means connecting said motor to said electrode for feeding it to the work, D. C. power supply means connected to the field of said motor, the armature of said motor being connected in parallel to the weld circuit, a relay connected in circuit with said motor, said relay having an operating coil connected in parallel with the weld circuit and an operating coil connected in series with said armature circuit, and a high and a low resistance associated with said armature circuit and said relay, said relay having two operative positions with one position being controlled by said parallel coil and being adapted to insert said high resistance in said armature circuit, the other position of said relay being controlled by said series coil and being adapted to insert said low resistance in series with said armature circuit, said relay being constructed and arranged so that said parallel coil controls said relay when the weld circuit is open and said series coil controls it when said weld circuit is closed.

5. In an automatic weld head control apparatus for supplying current to an arc through an electrode, an electric motor, an A. C. motor having two fields the reversal of one of which will cause opposite rotation of the motor, a separate starting and reverse switch for said A. C. motor, a relay connected in the circuit between said switch and said motor and being adapted to open such circuit when energized, and a common starting switch for both of said motors, said common starting switch being connected to a power supply and to said relay for energizing it when such switch is closed for cutting said separate starting and reversal switch out of the circuit of said A. C. motor.

6. In an automatic weld head control apparatus for supplying current to an arc through an electrode, a constant speed A. C. motor, a variable speed D. C. motor, said D. C. motor having its armature connected in parallel to an arc controlled by the apparatus, rectifier means having a constant D. C. output, means for connecting said rectifier means to an A. C. power supply, means for connecting the D. C. output of said rectifier means to the field of said D. C. motor, said A. C. motor having two fields the reversal of one of which will cause opposite rotation of the motor, a separate starting and reversal switch for said A. C. motor, a relay connected in the circuit between said switch and said motor and being adapted to open such circuit when energized, and a common starting switch for both of said motors, said common starting switch being connected to a conventional A. C. power supply and to said relay for energizing it when such switch is closed for cutting said separate starting and reversal switch out of the circuit.

7. In an automatic welding head control for a circuit having a greater open or starting circuit voltage than weld circuit voltage, a D. C. motor having its armature connected in parallel to the weld, said motor having a separately excited field, a relay having an operating coil connected in series with the armature of said motor and a second operating coil connected in parallel to the weld, said relay having a starting and a running position, said second operating coil being constructed and arranged to hold said relay in a starting position on the high circuit voltage existing until a weld arc is struck, and a resistance controlled by said relay and connected in its starting position in the armature circuit of said motor, said first operating coil overcoming the action of said second coil when normal weld circuit voltages are impressed on said relay to set same at its running condition to cut out said resistance from said armature circuit.

8. In an automatic welding head control in a welding circuit having a greater starting circuit voltage than the weld circuit voltage, a D. C. motor having a separately excited field, the armature of said motor being connected in parallel to the weld produced in the circuit, a relay having an operating coil connected in series with the armature of said motor and a second operating coil connected in parallel to the weld, said relay having a starting and a running position, said second operating coil being constructed and arranged to hold said relay in a starting position on the high starting circuit voltage existing until a weld arc is struck, and a resistance circuit controlled by said relay and connected in its starting position in the armature circuit of said motor, said first operating coil overcoming said second coil when operating conditions exist and setting said relay in its running condition to cut out said resistance circuit from said armature circuit.

FLOYD C. KNIGHT.
ELLIOTT C. CORNELL, Jr.

REFERENCES CITED

The following references are of record in the file of this patent:

UNITED STATES PATENTS

| Number | Name | Date |
| --- | --- | --- |
| 1,374,404 | Soons et al. | Apr. 12, 1921 |
| 1,508,710 | Noble | Sept. 16, 1924 |
| 1,701,372 | Jefts | Feb. 5, 1929 |
| 1,712,114 | Kjekstad | May 7, 1929 |
| 1,915,981 | Davis | June 27, 1933 |
| 1,969,520 | Nagashev | Aug. 7, 1934 |
| 1,989,546 | Chapman | Jan. 29, 1935 |
| 2,183,473 | Burgett | Dec. 12, 1939 |
| 2,276,057 | McCormick | Mar. 10, 1942 |
| 2,388,382 | Brongersma | Nov. 6, 1945 |
| 2,393,662 | Skuhrovec | Jan. 29, 1946 |
| 2,468,570 | Nyburg | Apr. 26, 1949 |